April 20, 1954
W. A. HUTCHINSON
2,676,029
DIRIGIBLE RUNNING GEAR CONSTRUCTION FOR
INDUSTRIAL TRAILER TRUCKS
Filed Dec. 24, 1952
4 Sheets-Sheet 2
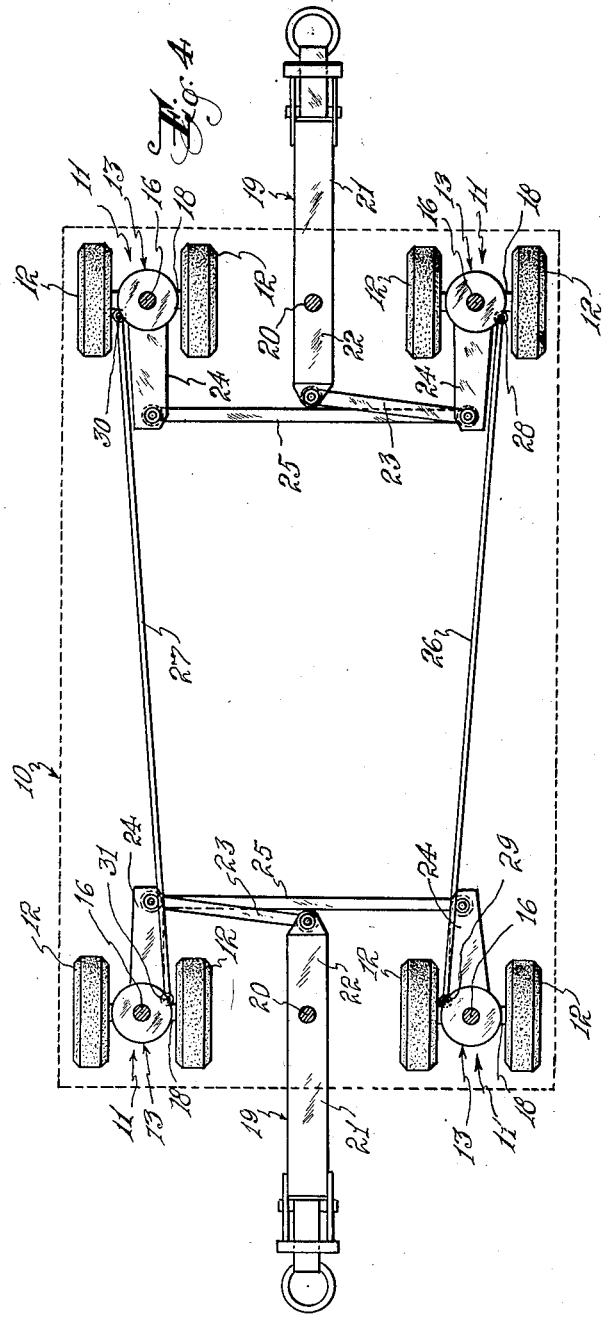
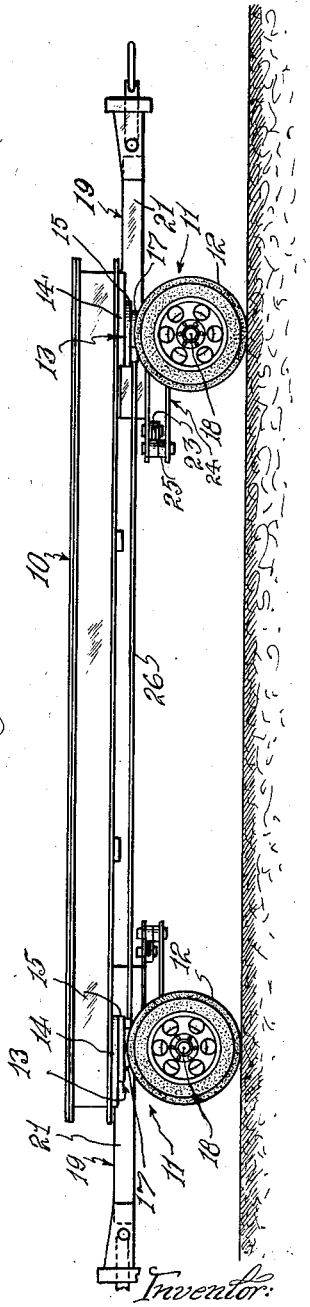
Inventor:
William A. Hutchinson
BY Dudley B. Howard
Attorney.

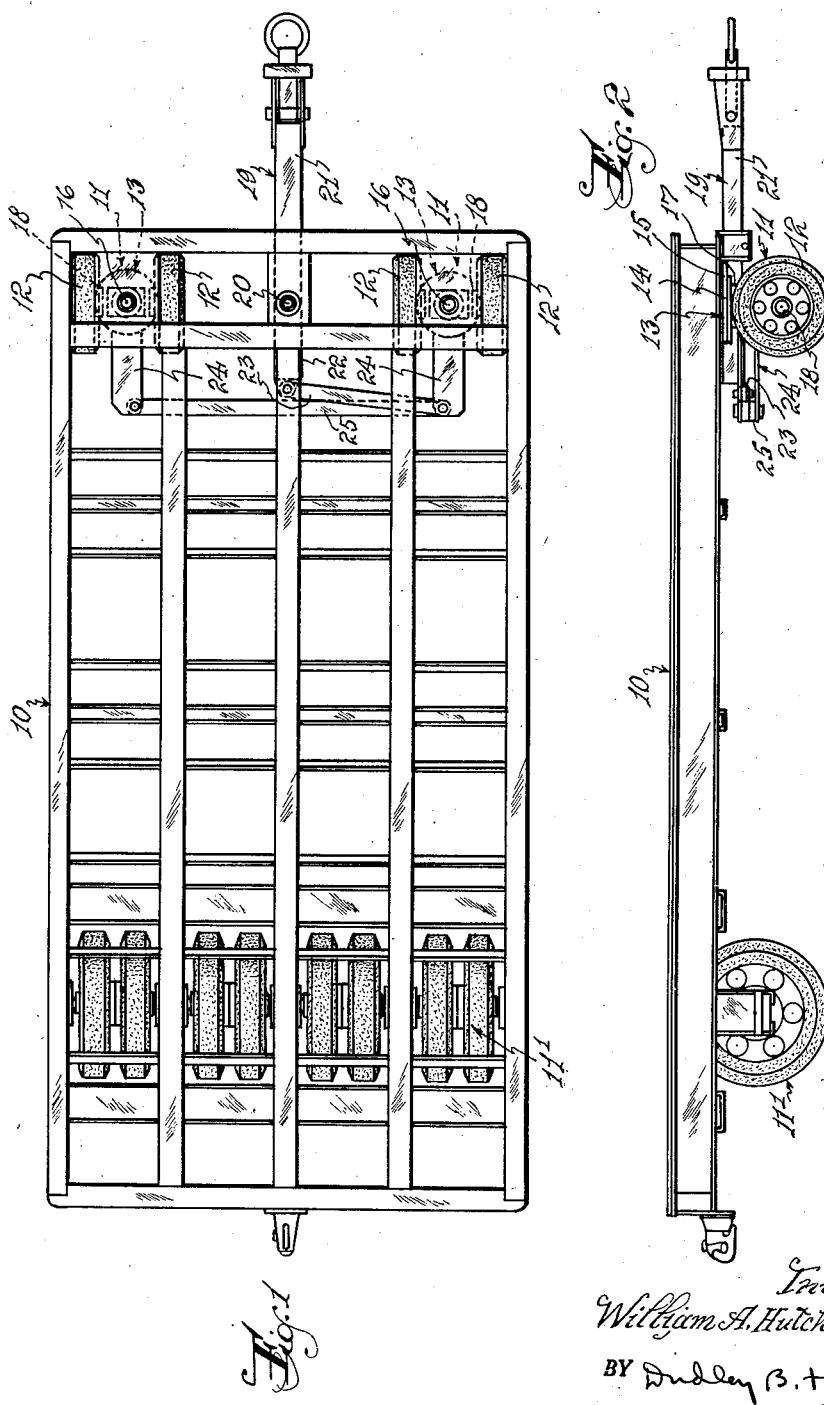

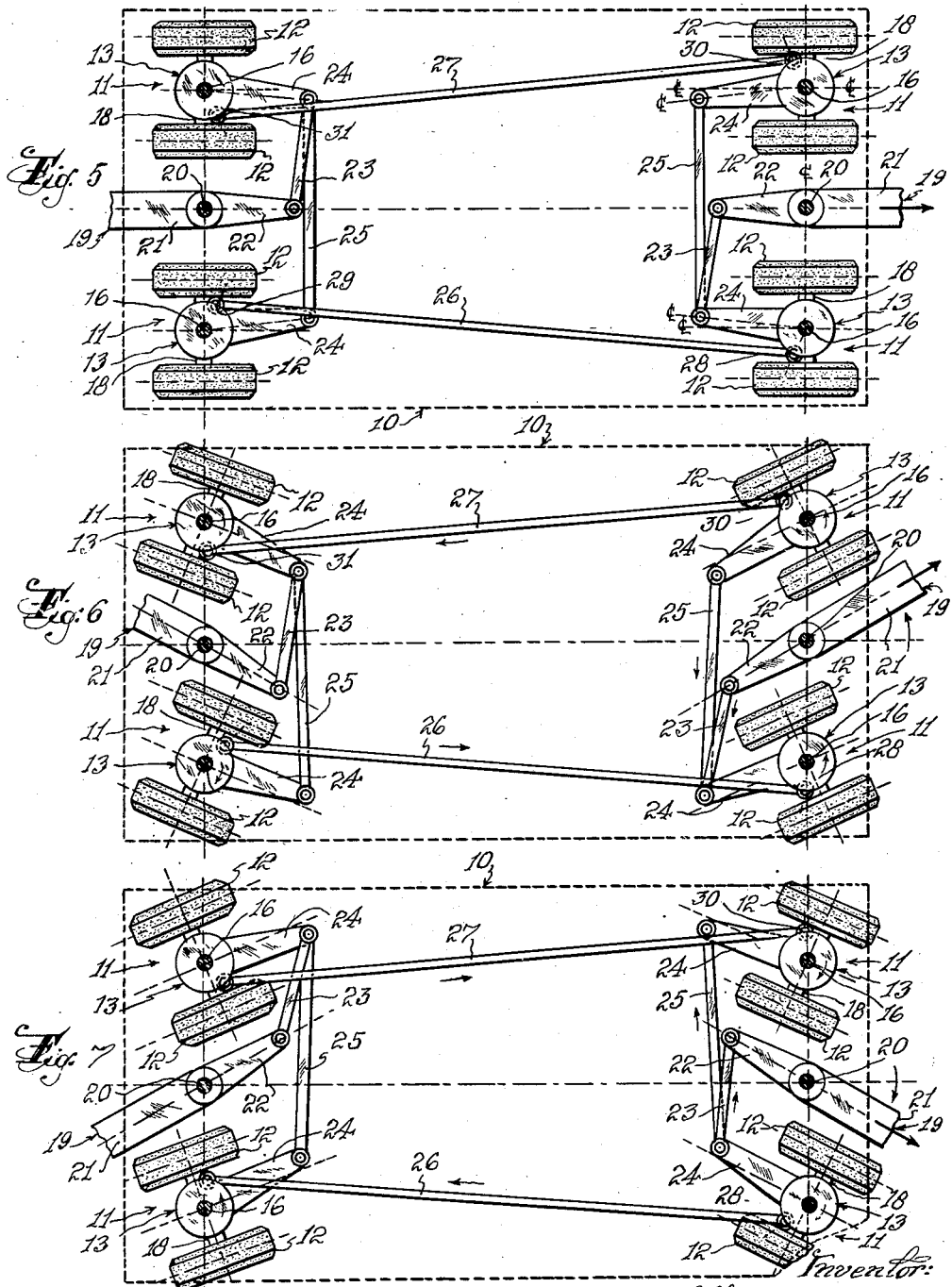

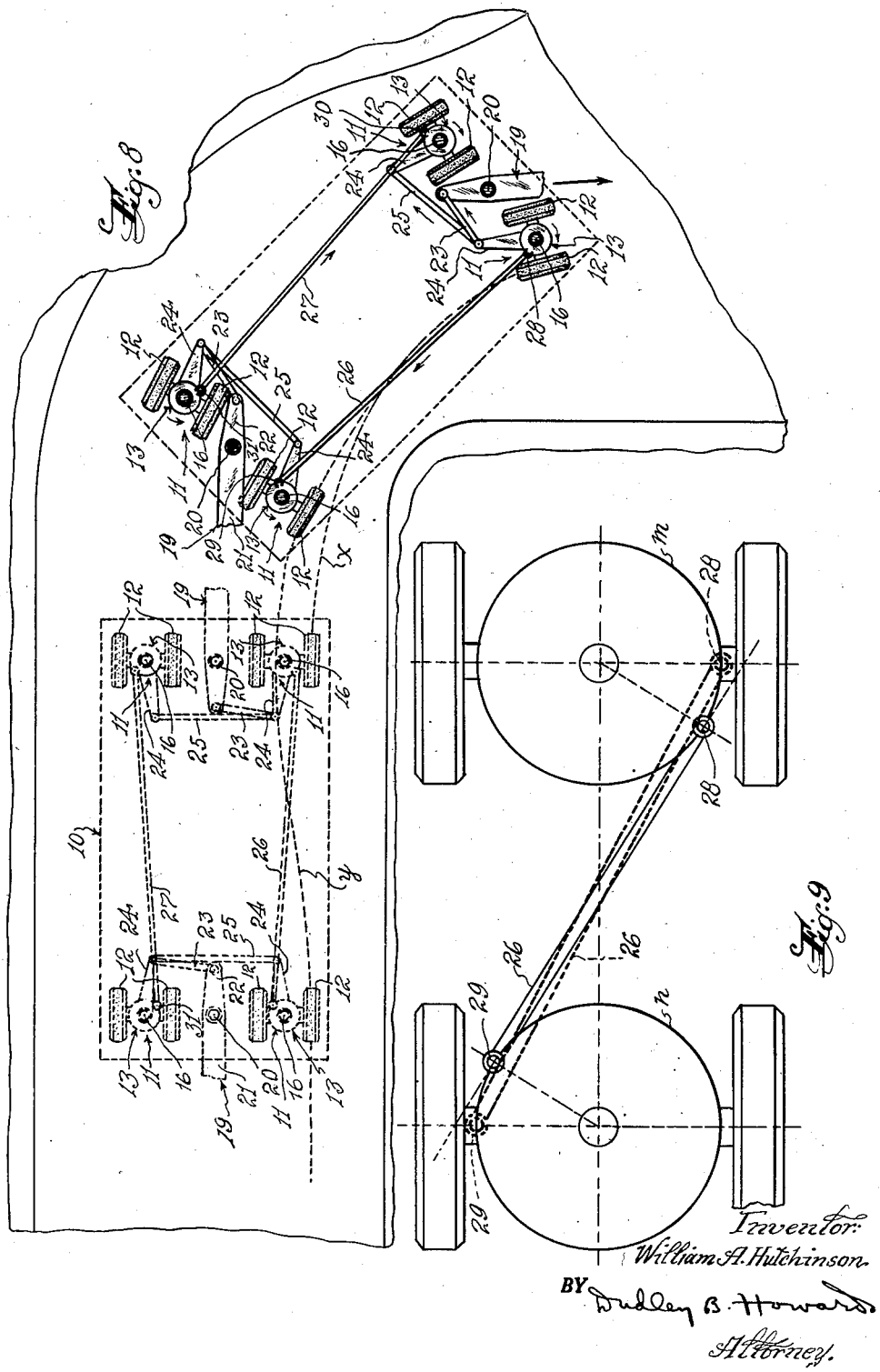

Patented Apr. 20, 1954

2,676,029

UNITED STATES PATENT OFFICE 2,676,029

DIRIGIBLE RUNNING GEAR CONSTRUCTION FOR INDUSTRIAL TRAILER TRUCKS

William A. Hutchinson, Chatham, N. J.

Application December 24, 1952, Serial No. 327,877

2 Claims. (Cl. 280—99)

The invention relates in general to trailer trucks such as are used at industrial plants to transport finished products or their component parts and factory equipment from place to place in and about warehouses, production areas and shipping docks and platforms, and has particular reference to trailer trucks of the heavy duty type required for loads which have to be towed by a tractor.

Industrial trailer trucks of the heavy duty type present serious problems which it has been my express purpose to solve. One of those problems was to devise running gear which will support the front end of a trailer truck frame in such a stable manner that sway and danger of overturning will be prevented on sharp turns, under which conditions the weight tends to shift toward the outside front corner of the frame.

Prior to my present invention, it has been common practice to locate a single road wheel under each front corner of a trailer truck frame, but the manner in which the two wheels of the pair are mounted in relation to the running gear for steering purposes does not afford sufficient stability of support for the frame. Caster wheel steer, knuckle wheel steer, and a single centrally located fifth wheel with an axle for the two widely spaced road wheels have been most commonly used for light duty trailer trucks but the first two types are unsafe with heavy loads and the last type is unsafe for wide truck frames.

It therefore is the primary object of the present invention to provide the front end of an industrial trailer truck with improved dirigible running gear which, to be specific, is in the form of dual fifth wheel running gear units, each having a pair of road wheels located at opposite sides of the swivel axis thereof with such spacing that the swivel axes of both running gear units will be as widely spaced as practicable in order to afford wide two-point support for the vehicle frame.

A further object of the invention is to provide means connecting the conventional towing bar of a trailer truck with the dual fifth wheel running gear units just mentioned in such manner that toe-out on turns will be applied to the respective right and left sets of front wheels, whereby the swivel axis of the running gear unit at the outside of a turn in either direction will translate through a horizontal curve of larger radius than that followed by the swivel axis of the inside running gear unit. Due to this action and also to the ability of the two road wheels on both sides of the swivel axis of either running gear unit to rotate at different velocities, the turning movement will be free and devoid of undue road friction or "scrubbing."

A further object is to provide a trailer truck that is peculiarly suited to the execution of abrupt turns in narrow passages and to use in congested areas, either indoors or outdoors, where it may be necessary to reverse the direction in order to withdraw from "blind alleys" after the delivery or pickup of a load. To be explicit, I achieve this object by duplicating at the rear end of the vehicle the dirigible dual fifth wheel steer heretofore described as being used at the front end. The front and rear steering gear both include towing bars so that either one may be coupled to a tractor selectively, depending upon the direction in which it is desired to proceed without having to turn around.

Another object is to provide means to interconnect the steering gear at both ends of the trailer truck in such a manner that the road wheels of the running gear at either end will turn in a direction opposite to those at the other end to facilitate the execution of sharp turns.

A still further object is to provide a unique arrangement of the means for interconnecting the front and rear steering gear, whereby the tow-out on turns applied to the dual sets of road wheels at the end of the vehicle that is moving forwardly will be transmitted to the sets of road wheels at the trailing end without any jamming or structural failure of the gear.

The above and other objects, features and advantages of the present invention will be more fully understood from the following specific description when considered in connection with the accompanying drawings, in which.

Fig. 1 is a plan view of an industrial trailer truck having a dual fifth wheel steer constructed in accordance with the invention at its front end only; and Fig. 2 is a side elevation of the same.

Fig. 3 is a side elevation of a double-ender quadruple fifth wheel steer embodiment of the invention adapted to be towed in either direction; and Fig. 4 is a semi-diagrammatic plan view of the running gear and steering gear of the same.

Figs. 5, 6 and 7 are semi-diagrammatic plan views of the quadruple steer of Figs. 3 and 4, showing the arrangement of the road wheels and steering gear when set for straight steering, for a turn to the left, and for a turn to the right, respectively.

Fig. 8 is a semi-diagrammatic plan view, showing a section of pavement with a right angle bend and a trailer truck embodying the quadruple fifth wheel steer principle in two successive positions while making the turn, that position represented in broken lines being in the straight approach to the bend and that in solid lines being midway in the turn.

Fig. 9 is a large scale semi-diagrammatic plan view of the right-hand running gear units alone, showing the development of the successful geometrical arrangement of the reach bar in relation to the front and rear wheel holders with which associated.

Referring now in detail to the drawings, wherein like reference characters designate corresponding parts in the several views, Figs. 1 and 2 disclose a heavy duty platform trailer truck having the simplified dual fifth wheel steer embodiment of the present invention at its front end only, the road wheels that support the rear end having in this instance a fixed axis of rotation.

Both front corners of vehicle frame 10 are supported by separate running gear units 11, each of which has dual road wheels 12—12 to afford a wide two-point support that will effectively prevent sway and danger of overturning when going around a corner with a heavy load. In this embodiment of the invention, the rear end of frame 10 is supported by fixed-axis running gear 11'. Each front running gear unit 11 includes a typical fifth wheel 13 consisting of an upper bearing member 14 affixed in suitable manner to frame 10 and a lower bearing member 15 directly supporting said upper bearing member and connected thereto for relative rotation on a vertical swivel axis by kingbolt 16. In the simplified form of this fifth wheel represented in the drawings, there is direct frictional bearing contact between members 14 and 15, but it is within the scope of the invention to reduce friction by the interposition of anti-friction bearings of any suitable type (not shown). Lower bearing member 15 is fixedly mounted on a wheel holder 17 having axle means 18 for road wheels 12—12, which latter are arranged on opposite sides of the swivel axis and equidistant therefrom in order to effect equal distribution of the load on both road wheels of the set and to reduce road friction by permitting one wheel to rotate at a different speed from the other when making a turn. Moreover, by mounting the two road wheels to revolve around a common center, the steering effort applied to towing bar 19 will be far less than that required to turn a single wheel of the same load-carrying capacity, which must twist around in place and will, because of its greater width, set up considerable road friction.

When the complete front running gear constituted by the two side-by-side units 11—11 is arranged for straight tracking, the road wheel axles of both said units will be in transverse alignment. This axle alignment is established by the draft gear for the vehicle, which includes towing bar 19. Near its rear end, towing bar 19 is pivotally connected to vehicle frame 10 along its center line by a vertical pivot bolt 20 that permits said towing bar to swing in a horizontal plane and serves as a fulcrum for the lever represented thereby. The front lever arm of towing bar 19 may be articulated as shown to permit vertical adjustment in accommodation to the level of the rear coupler of a tractor. The rear lever arm 22 of towing bar 19 is terminally connected by a link 23 to a steering arm 24 which projects preferably rearwardly from one of the wheel holders 17, in this instance the right-hand one. A similar steering arm 24 projects rearwardly from the wheel holder of the other, or left, running gear unit and is terminally connected pivotally to steering arm 24 of wheel holder 17 of the right running gear unit by tie rod 25. The distance between the points of pivotal connection of tie rod 25 to steering arms 24—24 is made sufficiently shorter than the distance between kingbolts 16—16 of the front running gear units 11—11 to cause the dual road wheels of both said units to toe-out on turns. With this dual fifth wheel steering arrangement, when towing bar 19 is swung to right or left for a turn, the wheel holder of the running gear unit on the inside of the turn will swivel to a greater degree than the wheel holder of the outer running gear unit. Consequently, the swivel axis of the inner wheel holder will translate through an arcuate path of small radius, whereas the swivel axis of the outer wheel holder will move through a translational path of proportionately greater radius. The dual road wheels of each of the two running gear units will roll parallel to the corresponding arcuate path of the swivel axis of said wheel holder, but the road wheel on the outside of the said path will be free to rotate faster than the inside wheel so true tracking without scrubbing is permitted.

Figs. 3 to 8 illustrate a modified form of fifth wheel steer in which the dual running gear units of the primary embodiment of the invention disclosed in Figs. 1 and 2 and the coacting steering gear are duplicated at the rear end of the truck. Due to this duplication and to consequent inclusion of a towing bar 19 at each end of the vehicle, the latter may be towed in either direction at will.

It being an object of the invention to cause the dual sets of road wheels at the end of the vehicle that may be trailing to turn in a direction opposite to that assumed by those in the lead when a turn to right or to left is made, I have provided means to accomplish this coordinated action. This means serves the additional purpose of transmitting toe-out on turns from the leading sets of dual road wheels to those which are trailing.

Referring now to Figs. 3 and 4, the aforementioned interconnecting means will be described in detail. Fore-and-aft right-hand and left-hand reach bars 26 and 27, respectively, connect the respective right front and right rear wheel holders 17—17 and the respective left front and left rear wheel holders 17—17 in the manner shown particularly in Fig. 4. To be more explicit, the front end of right-hand reach bar 26 is connected to the right-side or outer segmental portion of wheel holder 17 of the right front running gear unit 11 by vertical-axis pivot means 28, and the rear end of said reach bar is connected to the left-side or inner segmental portion of wheel holder 17 of the right rear running gear unit 11 by vertical-axis pivot means 29. Similarly, the front end of left-hand reach bar 27 is connected to the left-side or outer segmental portion of wheel holder 17 of left front running gear unit 11 by vertical-axis pivot means 30, and the rear end of said reach bar is connected to the right-side or inner segmental portion of wheel holder 17 of the left rear running gear unit 11 by vertical-axis pivot means 31. Each of the pivot means 28—29—30—31 is engaged with the corresponding wheel holder 17 at a location beneath bearing member 15 of the fifth wheel to which said wheel holder is affixed and at a radial distance from the swivel axis of the holder and fifth wheel that will afford sufficient leverage to cause the rear wheel holders to be swiveled readily by power transmitted thereto through the medium of the respective reach bars by lever action of front towing bar 19. Conversely, when the towing bar 19 at the rear end of the vehicle is swung to right or left, swiveling motion in the opposite direction will be transmitted from the rear wheel holders to those in front.

Before describing the specific manner in which the rear sets of dual wheels will track in relation to the front sets during turning movement of the vehicle, the precise angular positions of the pivot means 28—29—30—31 with respect to the swivel axes of the respective wheel holders when all road wheels are directed straight ahead (Figs. 3 and 4) which were finally determined, as a result of experimentation, to be operatively practical, will be discussed with reference to the semi-diagrammatic view of the front and rear running gear units and reach bar at the right side of the vehicle represented in Fig. 9. In this view, circles $m$ and $n$, which correspond to the outline of the superimposed fifth wheel bearing members, represent the paths of oscillatory movement of pivot means 28 and 29, respectively, around the swivel axes of the respective right front and right rear wheel holders. Reach bar 26 and pivot means 28 and 29 are shown in solid lines in the positions which they occupy in the finally adopted, successful arrangement, whereas the previously tried and rejected positions are depicted in broken lines. Referring first to the broken line positions, it will be observed that the axes of pivot means 28 and 29 are located directly above the respective front and rear wheel axes. With this arrangement, there might be no difficulty if it were not for the use of tie rods 25—25 in the steering gear at both ends of the vehicle. However, with the tie rods present during experimental tests of a working model having the arrangement shown in broken lines, structural failure occurred. In a cardboard test device, in which the reach bars were thin enough to be comparatively flexible, when either towing bar was swung to right or to left, the reach bars buckled. This indicated that failure occurred at the weakest points of the steering gear. When the reach bars are sufficiently rigid, structural failure is likely to take the form of pivot bolt shearing. Incidentally, failure occurred regardless of whether the pivotal connections between the opposite ends of tie rods 25—25 and steering arms 24—24 were more narrowly spaced than the swivel axes of the corresponding wheel holders 17—17, to afford toe-out on turns, or were spaced the same as said swivel axes.

On the contrary, the arrangement represented in solid lines in Fig. 9, wherein the center line of reach bar 26 geometrically constitutes a common internal tangent in relation to circles $m$ and $n$, was discovered after exhaustive experimentation to be operatively successful. Either towing bar can be swung freely to right or left, depending upon which way the vehicle is intended to be moved, without the slightest structural failure or other mechanical difficulty. This phenomenon is not easily explained, but it is believed that the major axis of the reach bar in either example (broken lines or solid lines) constitutes a base line. In the case of the longer reach bar shown in broken lines, the base line is oblique to a radial line from the swivel axis of each wheel holder through either pivot means 28 or 29, which radial lines represent power lever arms. On the contrary, the base line for the shorter reach bar shown in solid lines, being tangential to both circles $m$ and $n$, is perpendicular to the power arms represented by radial lines from the swivel axes of the respective wheel holders which intersect said base line at the points of tangency with said circles. Due to these vital differences, the degree of longitudinal thrust imparted to the broken line reach bar differs so much from the degree of thrust imparted to the solid line reach bar that a discrepancy in the relative movement of corresponding pivots 28—29—30—31 in the complete steering gear organization for all four wheel holders occurs. Apparently, when the broken line arrangement is used, the reach bars 26—27 (Fig. 4) will tend to transmit a degree of angular displacement motion to the various pivots at variance with the degree of displacement motion which tie rods 25—25 tend to produce. Consequently, there will be a tendency to foreshorten the distance between any two directly interconnected pivot means 28—29—30—31. Since tie rods 25—25 are shorter and thus more rigid than reach bars 26—27, the latter are more likely to buckle. However, if the tie rods and reach bars are made so stiff and rigid that the pivot means become the weaker elements of the steering organization, then shearing of the latter may occur instead of the buckling demonstrated in the cardboard test device. No matter what the correct theory underlying the difference in actual operation of the two reach bar arrangements may be, the common internal tangential relation to the wheel holders represented in all of Figures 3 to 9 of the drawings proved to be the practical solution to my problem and has been adopted for use in production of the double-ender quadruple fifth wheel steer embodiment of the present invention.

Figs. 5, 6 and 7 illustrate the manner in which the rear sets of dual road wheels are caused to turn in a direction opposite to that assumed by the front sets when the towing bar is swung to right or to left for a turn in either direction. Fig. 5 shows the arrangement of steering gear and road wheels when the towing bar projects straight forward for straight tracking, whereas Fig. 6 shows the arrangement for a turn to the left and Fig. 7 shows that for a right turn. In a turn in either direction, the same degree toe-out on turns which is applied to the front sets of dual road wheels will be transmitted to the rear sets of wheels.

Fig. 8 represents in broken lines a vehicle equipped with the improved double-ender quadruple fifth wheel steer when arranged for straight tracking, as in Fig. 4, in the approach to a bend in the pavement. In solid lines, the same vehicle is shown in a right turn to negotiate the bend. The track of the right front road wheels in the turn is represented by line $x$, whereas line $y$ shows the track followed by the right rear road wheels. It should be apparent that the inside wheels, both front and rear, will follow a small radius curve at the same time that the outside wheels follow a large radius curve, due to the front and rear application of toe-out on turns.

The versatility of the double-ender quadruple fifth wheel steer trailer truck is best demonstrated under the difficult passage-way conditions in an industrial plant wherein large machinery is installed in locations which leave only narrow intervening space. In such a situation, access to a load delivery or pickup spot may be so confined by machinery or other obstacles that the trailer truck can be towed into the spot for delivery or pickup of a load and the tractor can be uncoupled and maneuvered out again, but continued forward movement of the truck itself is impossible. Backing out with the tractor still coupled to the previously leading or front end of the truck is a difficult feat to perform but, with the double-ender steer arrangement, the tractor can be brought around to the trailing end and the truck can be towed back out of the "blind alley" despite any sharp turns which may have to be negotiated again in this retrograde movement.

It will be understood that it is intended to cover all changes and modifications of the examples of the invention herein chosen for the purpose of illustration which do not constitute departures from the spirit and scope of the invention.

Having thus described the invention, I claim:

1. A multiple fifth wheel steer for vehicles comprising, in combination: a vehicle frame having front and rear ends; running gear to support the respective front and rear ends of said frame, said running gear at each end of the frame consisting of a pair of widely spaced side-by-side units, each unit including an upper bearing member affixed to said frame, a cooperative lower bearing member movable with respect to said upper bearing member on a vertical swivel axis, a wheel holder supporting the lower bearing member, axle means provided on said wheel holder, and dual road wheels journaled by said axle means for differential rotation on opposite sides of the swivel axis and equidistant therefrom whereby both wheels revolve about a common center to reduce road friction; a horizontally swingable towing device located at least at the front end of the vehicle frame and being pivotally connected thereto; connecting means operatively interposed between the towing device and the respective wheel holders of the corresponding running gear units in a manner to swivel said wheel holders simultaneously from side to side in coordination with swinging movement of said towing device; and a reach bar interconnecting the wheel holders of the front and rear running gear units on each side of the vehicle; the front end of each reach bar being connected to the corresponding front wheel holder by vertical-axis pivot means located in one side segment of said wheel holder and the rear end of said reach bar being connected to the corresponding rear wheel holder by vertical-axis pivot means located in the opposite side segment of said wheel holder, whereby when the front wheel holders are turned in one direction the rear wheel holders will turn in the opposite direction; the pivot means at the front and rear ends of each reach bar being so arranged with respect to the swivel axes of the wheel holders of the corresponding front and rear running gear units that a straight line representing the longitudinal axis of said reach bar and intersecting said pivot means is geometrically a common internal tangent to circles concentric to the respective swivel axes which intersect said pivot means.

2. A multiple fifth wheel steer for vehicles as defined in claim 1, wherein the means connecting the towing device to the wheel holders of the corresponding running gear units is constructed and arranged to impart toe-out on turns to the respective sets of wheels supporting said wheel holders, whereby toe-out on turns will be transmitted to the sets of wheels at the opposite end of the vehicle by the respective reach bars during a turn.

References Cited in the file of this patent

UNITED STATES PATENTS

| Number | Name | Date |
|---|---|---|
| 724,149 | Whalley | Mar. 31, 1903 |
| 1,180,562 | Beggs | Apr. 25, 1916 |
| 1,925,712 | Campbell | Sept. 5, 1933 |
| 2,470,496 | Krilanovich | May 17, 1949 |
| 2,650,100 | Ronning | Aug. 25, 1953 |

FOREIGN PATENTS

| Number | Country | Date |
|---|---|---|
| 526,051 | Great Britain | Sept. 10, 1940 |
| 836,781 | France | Oct. 25, 1938 |